US009049697B2

(12) United States Patent
Toshimitsu

(10) Patent No.: US 9,049,697 B2
(45) Date of Patent: Jun. 2, 2015

(54) RADIO COMMUNICATION APPARATUS AND RADIO COMMUNICATION METHOD

(75) Inventor: Kiyoshi Toshimitsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 930 days.

(21) Appl. No.: 12/490,626

(22) Filed: Jun. 24, 2009

(65) Prior Publication Data

US 2010/0112944 A1 May 6, 2010

(30) Foreign Application Priority Data

Oct. 31, 2008 (JP) ................................. 2008-281602

(51) Int. Cl.
| | | |
|---|---|---|
| *H04W 88/06* | (2009.01) | |
| *H04W 76/02* | (2009.01) | |
| *H04L 29/06* | (2006.01) | |
| *H04W 12/02* | (2009.01) | |
| *H04W 12/06* | (2009.01) | |

(Continued)

(52) U.S. Cl.
CPC ......... *H04W 76/027* (2013.01); *H04B 10/2581* (2013.01); *H04B 1/005* (2013.01); *H04L 63/0492* (2013.01); *H04W 12/02* (2013.01); *H04W 12/06* (2013.01); *H04W 76/02* (2013.01); *H04W 88/06* (2013.01)

(58) Field of Classification Search
CPC ...... H04W 12/06; H04W 88/06; H04B 1/005; H04B 1/70758; H04B 7/024; H04B 7/0413; H04B 7/0452; H04B 10/2581
USPC .......... 455/39, 41.2, 510, 66.1, 67.11, 68, 69, 455/425; 370/310, 324, 328, 334, 350; 375/220
See application file for complete search history.

(56) References Cited

U.S. PATENT DOCUMENTS 6,873,252 B2 *  3/2005  Ono ............................. 340/436
7,158,756 B2 *  1/2007  Palin et al. ................... 455/41.2

(Continued)

FOREIGN PATENT DOCUMENTS

| | | |
|---|---|---|
| JP | 2002-118577 | 4/2002 |
| JP | 2003-188805 | 7/2003 |

(Continued)

OTHER PUBLICATIONS

Japanese Office Action for Japanese Application No. 2008-281602 mailed on Aug. 24, 2012.

*Primary Examiner* — Andrew Wendell
(74) *Attorney, Agent, or Firm* — Amin, Turocy & Watson, LLP

(57) ABSTRACT

A radio communication apparatus includes: a first communication unit having a first communication coverage including a short-distance portion and a long-distance portion; a second communication unit having a second communication coverage including at least the long-distance portion; a reception detecting unit detecting that a short-distance communication request transmitted from a first communication unit of an other communication apparatus has been received by at least one of the first and second communication units; a determining unit permitting the request when the request is received by the first communication unit and not received by the second communication unit, and rejecting the request when the request is received by the second communication unit; and a communication processing unit carrying out short-distance communication with the other communication apparatus via the first communication unit when the request is permitted.

20 Claims, 12 Drawing Sheets

(51) Int. Cl.
*H04B 10/2581* (2013.01)
*H04B 1/00* (2006.01)

(56) References Cited

U.S. PATENT DOCUMENTS

| | | | |
|---|---|---|---|
| 7,305,250 B2 * | 12/2007 | Choi | 455/550.1 |
| 7,706,834 B2 * | 4/2010 | Kim et al. | 455/552.1 |
| 2005/0136837 A1 * | 6/2005 | Nurminen et al. | 455/41.2 |
| 2005/0282575 A1 * | 12/2005 | Dorenbosch | 455/550.1 |
| 2006/0046719 A1 * | 3/2006 | Holtschneider | 455/434 |
| 2006/0240811 A1 * | 10/2006 | De Luca | 455/414.3 |
| 2008/0139118 A1 * | 6/2008 | Sanguinetti | 455/41.2 |
| 2009/0096556 A1 * | 4/2009 | Washiro | 333/24 R |
| 2009/0221283 A1 * | 9/2009 | Soliman | 455/426.1 |
| 2009/0227206 A1 * | 9/2009 | Tada et al. | 455/41.2 |
| 2010/0069067 A1 * | 3/2010 | Vanderveen et al. | 455/435.1 |

FOREIGN PATENT DOCUMENTS

| | | |
|---|---|---|
| JP | 2004-248215 | 9/2004 |
| JP | 2006-060470 | 3/2006 |

\* cited by examiner (A)

| APPLICATION IDENTIFIER | NETWORK IDENTIFIER | ENCRYPTION KEY |
|---|---|---|
| Ap#1 | Net-id#1 | Key#1 |
| Ap#2 | Net-id#2 | Key#2 |

(B)

| APPLICATION IDENTIFIER | NETWORK IDENTIFIER | ENCRYPTION KEY | CHANNEL INFORMATION |
|---|---|---|---|
| Ap#1 | Net-id#1 | Kye#1 | Ch#1 |
| Ap#2 | Net-id#2 | Kye#2 | Ch#2 |

FIG. 12

RADIO COMMUNICATION APPARATUS AND RADIO COMMUNICATION METHOD

CROSS REFERENCE TO RELATED APPLICATIONS

This application is based upon and claims the benefit of priority from the prior Japanese Patent Applications No. 2008-281602, filed on Oct. 31, 2008; the entire contents of which are incorporated herein by reference.

BACKGROUND OF THE INVENTION

1. Field of the Invention

The present invention relates to a radio communication apparatus and a radio communication method, and relates to, for example, a method for carrying out short-distance communication (secret communication) among a plurality of radio communication apparatuses.

2. Related Art

The method described in Japanese Patent No. 3669293 is known as a method for initial setting (authentication procedure or the like) for a plurality of radio communication apparatuses. According to the method described in Japanese Patent No. 3669293, when portable devices fall under the realm of radio wave thereof each other, that is, move closer to a predetermined distance from each other, both devices authenticate each other automatically or with users' confirmations. This can reduce complicated processes such as entries of ID numbers and passwords in an authentication procedure with the portable devices.

On the other hand, the method described in JP-A 2006-60470 (Kokai) is also known as an initial setting method for a plurality of radio communication devices. JP-A 2006-60470 (Kokai) discloses an initial setting method when there are a plurality of portable devices, but the user needs to know a device for reporting setting information and a device for receiving the report before operating the devices.

According to the above-described method of Japanese Patent No. 3669293, when automatic authentication is permitted while the radio communication apparatuses (portable devices) are not so close to each other, there is an increased risk that authentication information may be eavesdropped, which causes security problems. Furthermore, when an authentication button is depressed after the radio communication apparatuses approach each other, there may be a problem that it is difficult to depress the authentication button depending on the position where the authentication button is placed. Therefore, Japanese Patent No. 3669293 also presents the method of depressing the authentication button before approaching and starting automatic authentication when the apparatuses approach each other. According to this method, a detector for detecting that the radio communication apparatuses approach each other (that is, the distance from other party apparatus) is additionally mounted and transmits authentication information when the approach is detected. Although this can solve operability-related problems, the security depends on the accuracy of detecting the approach to a great extent and there still remains a problem that automatic authentication may be performed even when the radio communication apparatuses are not so close to each other.

Furthermore, another problem of the method according to Japanese Patent No. 3669293 is that it is a method for proceeding authentication between two portable devices and when an attempt is made to additionally authenticate another portable device against two portable devices which have already completed authentication, the initial setting procedure becomes complicated. When, for example, an attempt is made to authenticate a portable device C against a set of portable device A and portable device B, which have already completed the authentication procedure to enable three-party communication, the portable device C needs to perform mutual authentication against the portable device A and portable device B separately. This means that if the number of portable devices is N, authentication needs to be performed after making the portable devices approach $C(N, 2)=N\times(N-1)/(2\times1)$ times. Therefore, the procedure for initial setting becomes more troublesome as the number of portable devices increase. For example, when initial setting is performed on five portable devices, ten approaches are required.

SUMMARY OF THE INVENTION

According to an aspect of the present invention, there is provided with a radio communication apparatus comprising:

a first communication unit configured to have a first communication coverage including a short-distance portion and a long-distance portion;

a second communication unit configured to have a second communication coverage including at least the long-distance portion;

a reception detecting unit configured to detect that a short-distance communication request has been received by at least one of the first communication unit and the second communication unit;

a permission/rejection determining unit configured to permit the short-distance communication request when the short-distance communication request is received by the first communication unit and not received by the second communication unit, and reject the short-distance communication request when the short-distance communication request is received by the second communication unit; and a first communication processing unit configured to carry out short-distance communication with an other communication apparatus which has transmitted the short-distance communication request, via the first communication unit when the short-distance communication request is permitted.

According to an aspect of the present invention, there is provided with a radio communication method performed in a radio communication apparatus which includes a first communication unit having a first communication coverage including a short-distance portion and a long-distance portion and a second communication unit having a second communication coverage including at least the long-distance portion, the method comprising:

detecting that a short-distance communication request has been received by at least one of the first communication unit and the second communication unit;

permitting the short-distance communication request when the short-distance communication request is received by the first communication unit and not received by the second communication unit, and rejecting the short-distance communication request when the short-distance communication request is received by the second communication unit; and carrying out short-distance communication with an other communication apparatus which has transmitted the short-distance communication request, via the first communication unit when the short-distance communication request is permitted.

BRIEF DESCRIPTION OF THE DRAWINGS

FIG. 12 shows an example of setting information.

DETAILED DESCRIPTION OF THE INVENTION

Hereinafter, embodiments of the present invention will be explained in detail with reference to the accompanying drawings.

Figure 1:
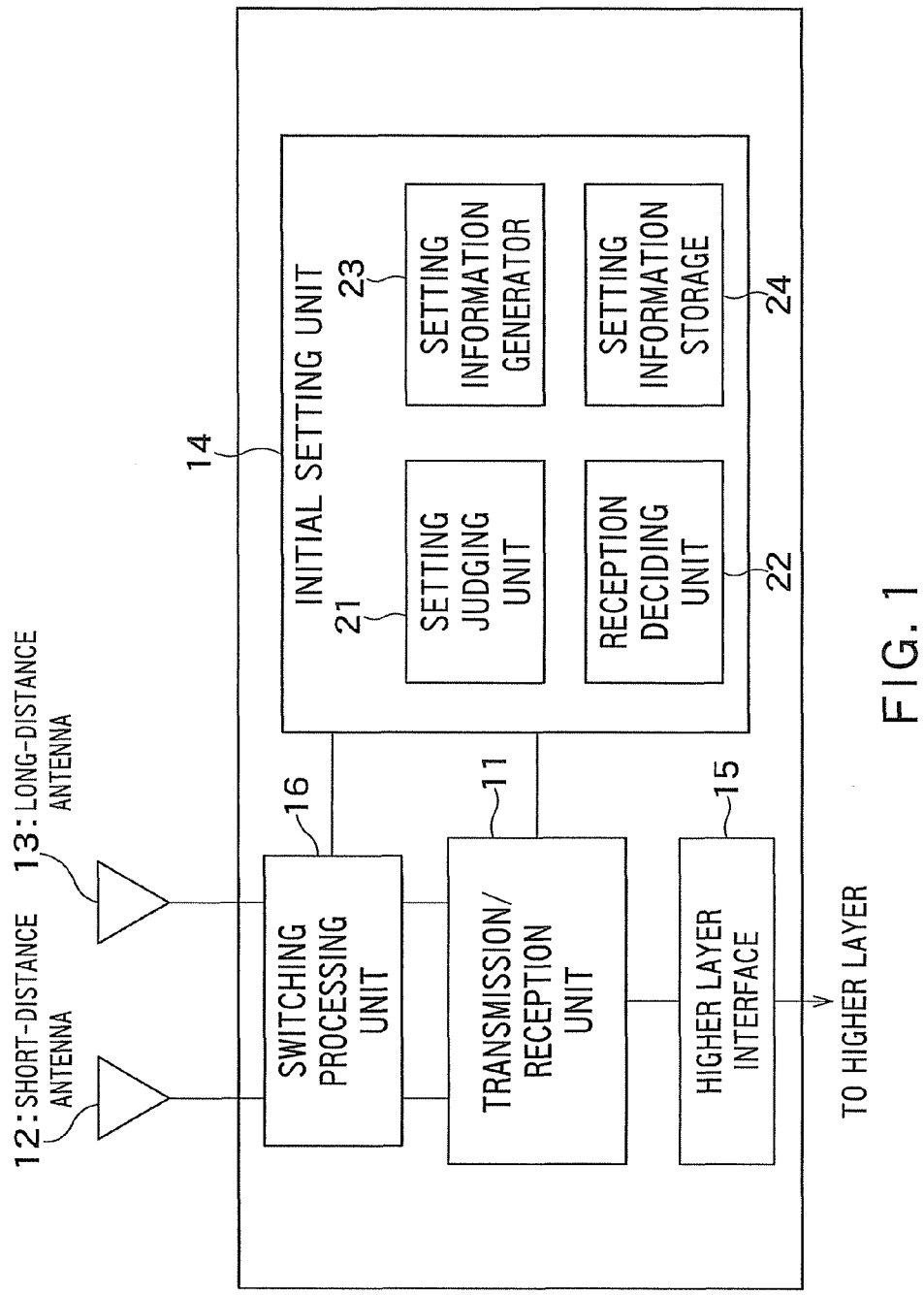
FIG. 1 is a block diagram showing a first configuration example of a radio communication apparatus according to an embodiment of the present invention.

FIG. 1 shows a first configuration example of a radio communication apparatus according to an embodiment of the present invention.

The radio communication apparatus in FIG. 1 is provided with a transmission/reception unit 11, a short-distance antenna 12, a long-distance antenna 13, an initial setting unit 14, a higher layer interface 15 and a switching processing unit 16. The initial setting unit 14 is provided with a setting judging unit (a first communication processing unit, a permission/rejection determining unit, first to third starting units, a request transmitting unit, an acquisition request transmitting unit, a setting information acquiring unit, a setting information transmitting unit, and an inspecting unit of the present invention.) 21, a reception deciding unit (reception detecting unit) 22, setting information generator 23 and a setting information storage 24.

The short-distance antenna 12 has a first communication coverage and the long-distance antenna 13 has a second communication coverage, which is different from the first communication coverage. More specifically, when the first communication coverage of the short-distance antenna 12 is divided into a short-distance portion and a long-distance portion from the radio communication apparatus, the second communication coverage of the long-distance antenna 13 is such a communication coverage that does not include at least the short-distance portion but includes the long-distance portion. For example, while the communication coverage of the short-distance antenna 12 is 0 to 3 cm, the communication coverage of the long-distance antenna 13 is 2 cm to 10 m. In this case, of the communication coverage of the short-distance antenna 12, the part 0 to 2 cm corresponds to the short-distance portion, whereas the part 2 cm to 3 cm corresponds to the long-distance portion. An induction field antenna is a representative one that realizes the short-distance antenna 12, while a radiation field antenna is a representative one that realizes the long-distance antenna 13. These short-distance antenna 12 and long-distance antenna 13 will be explained as follows.

When the other party radio communication apparatus is distant, a radio signal transmitted using the short-distance antenna of the radio communication apparatus can be received using the long-distance antenna of the other party apparatus, but cannot be received using the short-distance antenna of the other party apparatus. When the distance between the two apparatuses is reduced, a radio signal transmitted from the short-distance antenna of the radio communication apparatus can be received by both the short-distance antenna and the long-distance antenna of the other party apparatus, and when the distance is further reduced, the radio signal can be received by only the short-distance antenna of the other party apparatus. This is because when the apparatuses approach each other, it is not possible to realize impedance matching between the short-distance antenna and the long-distance antenna, and the apparatuses can only communicate using the short-distance antennas.

The above-described example has shown the method realized using impedance matching, but the present invention is not limited to the above-described method, and assuming a first state in which the distance between the apparatuses is large, a second state in which the distance between the apparatuses is slightly reduced and a third state in which the distance between the apparatuses is further reduced, the radio signal transmitted by the short-distance antenna may be received by only the long-distance antenna in the first state, received by both the long-distance and short-distance antennas in the second state and received by only the short-distance antenna in the third state. Furthermore, there can be only the second state and the third state without the aforementioned first state.

The initial setting unit 14 sets setting information common to the other party communication apparatus by performing initial setting through data communication with the other party communication apparatus via the short-distance antenna 12 before starting long-distance communication (data communication via the long-distance antenna 13) with the other party communication apparatus. The setting information includes an encryption key for securing security and a communication identifier (network identifier) for identifying communication using this encryption key. However, the configuration of the setting information is not limited to this and other configurations may also be used (see FIG. 12 which will be described later). The detailed operation of the initial setting unit 14 will be described later.

The higher layer interface 15 is an interface with a higher layer (application), and transmits data received from the higher layer to the transmission/reception unit 11 and sends data received from the transmission/reception unit 11 to the higher layer.

The switching processing unit 16 selectively switches between the short-distance antenna 12 and long-distance antenna 13 according to an instruction from the initial setting unit 14 and makes a connection with the transmission/reception unit 11. For example, in an initial setting mode, the switching processing unit 16 receives an instruction from the initial setting unit 14 to connect the transmission/reception unit 11 to the short-distance antenna 12 and receives, in a communication mode after the initial setting, an instruction to connect the transmission/reception unit 11 to the long-distance antenna 13. Furthermore, the switching processing unit 16 also has the function (measuring unit) of detecting the reception level of each antenna 12, 13 and reporting the reception level to the initial setting unit 14.

The transmission/reception unit 11 performs transmission processing on the data received from the initial setting unit 14 or higher layer interface 15 generate a transmission signal and emits the transmission signal into the air as radio wave via the short-distance antenna 12 or the long-distance antenna 13. Furthermore, the transmission/reception unit 11 receives the signal by radio via the short-distance antenna 12 or long-distance antenna 13 to acquire received data by applying reception processing to the received signal and sends the acquired data to the initial setting unit 14 or higher layer interface 15. The transmission/reception unit 11 will be explained in further detail as follows.

The transmission/reception unit 11 performs transmission processing (e.g., processing on a MAC layer or the like, modulation, DA conversion, filtering, up-conversion, amplification or the like) on the data received from the initial setting unit 14 in the initial setting mode to generate a transmission signal and transmits the transmission signal via the short-distance antenna 12. Furthermore, the transmission/reception unit 11 performs reception processing (e.g., amplification, down-conversion, filtering, AD conversion, demodulation, MAC layer processing) on the signal received via the short-distance antenna 12 in the initial setting mode to acquire received data and outputs the received data to the initial setting unit 14.

Furthermore, the transmission/reception unit 11 performs transmission processing on the data received from the higher layer interface 15 in the communication mode carried out after completion of the initial setting mode (after authentication is completed) to generate a transmission signal and transmits the transmission signal via the long-distance antenna 13. This transmission processing encrypts the transmission data using an encryption key set through the initial setting and also includes a communication identifier in the transmission frame. Furthermore, the transmission/reception unit 11 performs reception processing on the signal received via the long-distance antenna 13 in the same communication mode to acquire received data and sends the received data to the higher layer interface 15. This reception processing decides whether or not the above-described communication identifier is included in the acquired received frame, receives this received frame when the communication identifier is included, decodes the encrypted data included in the received frame using the above-described encryption key and outputs the decoded data to the higher layer interface unit 15. The received frame in which the above-described communication identifier is not included or a received frame in which a different communication identifier is included is discarded, for example. In the communication mode, it is also possible to carry out communication using the short-distance antenna 12 depending on the situation of proximity to other party apparatuses.

The short-distance antenna 12 or the set of the short-distance antenna 12 and the transmission/reception unit 11 corresponds to the first communication unit of the present invention, and the long-distance antenna 13 or the set of the long-distance antenna 13 and the transmission/reception unit 11 corresponds to the second communication unit of the present invention. Furthermore, the setting judging unit 21 corresponds to, for example, the first communication processing unit, permission/rejection determining unit, first to third starting units, request transmitting unit, acquisition request transmitting unit, setting information acquiring unit, setting information transmitting unit or inspecting unit of the present invention. Furthermore, the reception deciding unit 22 corresponds to, for example, the reception detecting unit of the present invention and the setting information storage 24 corresponds to, for example, the storage of the present invention. Furthermore, the higher layer interface 15 or higher layer or both of them corresponds to, for example, the second communication processing unit of the present invention.

Hereinafter, operation of the initial setting unit 14 will be explained in detail.

Figure 6:
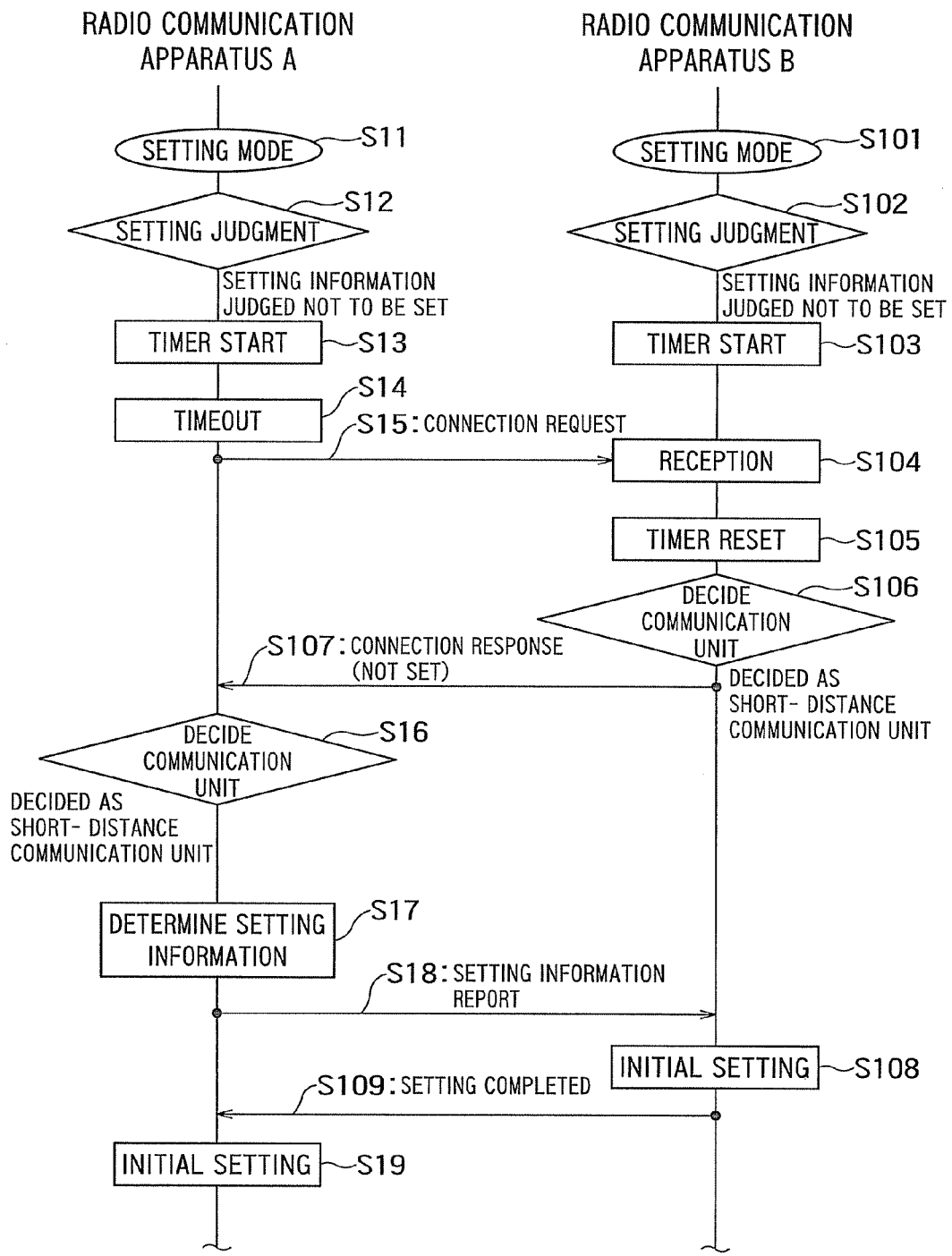
FIG. 6 shows a first example of initial setting sequence carried out between two radio communication apparatuses.

FIG. 6 shows a first example of a sequence of initial setting (authentication processing) carried out between two radio communication apparatuses A and B of the present embodiment. Hereinafter, the present embodiment assumes a situation in which users A and B cause the radio communication apparatuses A and B to approach each other to carry out an initial setting (authentication procedure) between the radio communication apparatuses A and B through short-distance communication (secret communication) and then carry out long-distance communication between the radio communication apparatuses A and B with the users moving apart from each other.

Each user of the radio communication apparatuses A and B depresses the setting button, the initial setting unit 14 of each radio communication apparatus detects this depression and each radio communication apparatus enters an initial setting mode (S11, S101). The initial setting unit 14 of the radio communication apparatuses A and B instructs the switching processing unit 16 to connect the transmission/reception unit 11 to the short-distance antenna (short-distance communication unit) 12 and the switching processing unit 16 of the radio communication apparatuses A and B connects the short-distance antenna 12 to the transmission/reception unit 11 according to this instruction. Each radio communication apparatus is provided with a reception unit that receives an instruction for executing short-distance communication from the user. The instruction for executing short-distance communication corresponds to a signal of depressing the setting button.

The setting judging unit 21 of the radio communication apparatuses A and B decides whether or not the setting information is set (stored) in the setting information storage 24 (S12, S102).

When the setting information is not set, the setting judging unit 21 of the radio communication apparatuses A and B sets the timer to random values respectively and starts the timer (S13, S103). This corresponds to processing of the first starting unit of the present invention. Here, suppose the setting information is not set in the setting information storage 24 of the radio communication apparatuses A and B. The range of values the timer can take is predetermined and the timer value is randomly determined within the range.

When the timer times out, the setting judging unit 21 of the radio communication apparatuses A and B transmits a connection request (short-distance communication request or secret communication request) frame via the short-distance antenna 12. On the other hand, when a connection request frame is received from the other radio communication apparatus before the timer times out, the setting judging unit 21 of the radio communication apparatuses A and B resets the timer and determines not to transmit the connection request frame. The reception deciding unit 22 makes a decision on the reception and when the demodulated connection request frame is inputted to the initial setting unit 14 or when the long-distance antenna (long-distance communication unit) 13 detects a reception level equal to or higher than a threshold after the start of the timer or when both of them are detected, the reception deciding unit 22 decides that the connection request frame has been received. Here, the timer of the radio communication apparatus A times out first (S14) and transmits the connection request frame (first short-distance communication request) via the short-distance antenna 12 (S15). The reception deciding unit 22 then decides that this connection request frame has been received by the radio communication apparatus B before a timeout (S104). Therefore, the setting judging unit 21 of the radio communication apparatus B resets the timer (S105) and determines not to transmit any connection request frame.

The reception deciding unit 22 of the radio communication apparatus B having decided that the connection request frame has been received decides the antenna that has received the connection request frame (S106). More specifically, the reception deciding unit 22 decides whether the connection request frame has been received by only the short-distance antenna (short-distance communication unit) 12 or only the long-distance antenna (long-distance communication unit) 13 or both the long-distance and short-distance antennas 12 and 13. This decision corresponds to the aforementioned decision on any one of the first to third states. S104 and S106 correspond to, for example, the processing of the reception detecting unit of the present invention. The decision is made, for example, as follows.

When the demodulated connection request frame is inputted from the transmission/reception unit 11 to the initial setting unit 14 and the long-distance antenna 13 has not detected any reception level equal to or higher than a threshold after the start of the timer, the reception deciding unit 22 decides that the connection request frame has been received by only the short-distance antenna 12 (third state). When the demodulated connection request frame is inputted from the short-distance antenna 12 and when the long-distance antenna 13 has detected a reception level equal to or higher than the threshold after the start of the timer, the reception deciding unit 22 decides that the connection request frame has been received by both antennas 12 and 13 (second state). When the long-distance antenna 13 has detected a reception level equal to or higher than the threshold after the start of the timer and the demodulated connection request frame is not inputted from the short-distance antenna 12, the reception deciding unit 22 decides that the connection request frame has been received by only the long-distance antenna 13 (first state). The reception deciding unit 22 may also decide that the connection request frame has been received based on the fact that the reception level of the short-distance antenna 12 has become equal to or higher than a threshold instead of deciding the reception of the connection request frame at the short-distance antenna 12 based on the fact that the demodulated connection request frame has been inputted.

When the reception deciding unit 22 decides that the connection request frame has been received by only the short-distance antenna 12 of the radio communication apparatus B (third state), the reception deciding unit 22 decides that the other party radio communication apparatus is approaching, thereby decides that it is possible to perform initial setting with the other party radio communication apparatus and permits the connection request. This corresponds to the processing of the permission/rejection determining unit of the present invention. The setting judging unit 21 of the radio communication apparatus B transmits a connection response frame (permission response) via the short-distance antenna 12 as a response frame to the connection request frame (S107). In this case, information for reporting that the initial setting of the own apparatus has not been made yet (setting information has not been set yet) is included in the connection response frame. On the other hand, when the reception deciding unit 22 of the radio communication apparatus B decides that the connection request frame has been received by the long-distance antenna 13 or both the long-distance and short-distance antennas 12 and 13 (first or second state), the reception deciding unit 22 decides that the other party apparatus is not approaching yet, rejects the connection request and does not transmit the connection response frame. This corresponds to the processing of the permission/rejection determining unit of the present invention. In this case, the radio communication apparatus B waits for retransmission from the radio communication apparatus A. Here, suppose that the radio communication apparatus B has received the connection request frame by only the short-distance antenna 12 and transmitted the connection response frame and the reception deciding unit 22 of the radio communication apparatus A decides that this connection response frame has been received by the radio communication apparatus A. The decision on the reception is made in the same way as in the explanation of S14 above.

The reception deciding unit 22 of the radio communication apparatus A having received the connection response frame decides the antenna (communication unit) that has received the connection response frame (S16). This decision is made in the same way as for the decision in S106 above. When it is decided that the connection response frame has been received by only the short-distance antenna 12 (third state), the setting judging unit 21 of the radio communication apparatus A inspects, based on the connection response, whether the setting information has not been set yet at the radio communication apparatus B. This corresponds to the processing of the inspecting unit of the present invention. Here, since the connection response describes that the setting information has not been set yet, the radio communication apparatus A decides to generate setting information by itself and instructs the setting information generator 23 to generate the setting information. A processing example where it is decided that the connection response frame has been received by the long-distance antenna 13 or both the long-distance and short-distance antennas 12 and 13 (first or second state) will be described later.

The setting information generator 23 of the radio communication apparatus A generates the setting information according to the instruction from the setting judging unit 21 (S17). The setting judging unit 21 generates a setting information report frame for reporting the generated setting information and transmits the setting information report frame to the radio communication apparatus B via the short-distance antenna 12 (S18). This corresponds to an example of processing of the setting information transmitting unit of the present invention. Here, the values of the encryption key and communication identifier (network identifier) forming the setting information need not be recognizable to humans at all and may be determined randomly. Since the value of the setting information is automatically determined by the setting information generator 23 and need not be determined by the user, the load on the user is reduced.

When the reception deciding unit 22 of the radio communication apparatus B decides that the setting information report frame has been received via the short-distance antenna 12 in response to the transmission of the connection response frame in S106, the setting judging unit 21 extracts the setting information described in the setting information report frame and stores the setting information in the setting information storage 24 (S108). This completes the initial setting on the radio communication apparatus B side. The setting judging unit 21 then transmits a setting completion frame for reporting that the initial setting on the radio communication apparatus B side has been completed to the radio communication apparatus A via the short-distance antenna 12 (S109). An Ack frame in response to the reception of the setting information report frame may also be substituted for this setting completion frame.

Upon deciding that the radio communication apparatus A has received the setting completion frame from the radio communication apparatus B via the short-distance antenna 12, the setting information generator 23 of the radio communication apparatus A causes the setting information storage 24 to store the setting information (S19). This completes the initial setting on the radio communication apparatus A side and common setting information is stored in both the radio communication apparatuses A and B.

Hereafter, it is possible to cancel the approach between the radio communication apparatuses A and B and carry out long-distance communication (e.g., transmission/reception of data such as video data, voice data, text data) between the radio communication apparatuses A and B based on the commonly stored setting information via the long-distance antenna 13.

Here, as described above, the setting information includes the encryption key for securing security and the communication identifier (network identifier) for identifying communication using this encryption key. Since the radio communication apparatuses A and B encrypt data using this encryption key and transmit the encrypted data, even if another apparatus to which this encryption key is unknown receives the transmission data, it is possible to prevent the contents thereof from being known.

Furthermore, since the transmitting side of the radio communication apparatuses A and B transmits a transmission frame including a communication identifier, the receiving side of the radio communication apparatuses A and B can filter the received frame based on the communication identifier, and can thereby omit useless reception processing for frames that need not be received.

For example, when the destination address of the transmission frame is set as the communication identifier, the receiving side apparatus can select only a frame that matches the communication identifier acquired through the initial setting and perform reception processing. That is, when the destination address of the frame is different from the communication identifier, the frame can be discarded without being subjected to reception processing. In this case, the length of the communication identifier needs to be the same as the length of the address.

Furthermore, the destination address of the frame may be designated as the broadcast address and another field of the frame may be designated as the communication identifier. In this case, since the destination address is the broadcast address, radio communication apparatuses other than the radio communication apparatuses A and B can also receive the frame. However, by checking the communication identifier described in the above-described other field, each apparatus can decide whether or not the received frame is a frame necessary for each apparatus. In this case, since the length of the communication identifier has nothing to do with the length of the address, the length of the communication identifier need not be the same as the length of the address.

Figure 7:
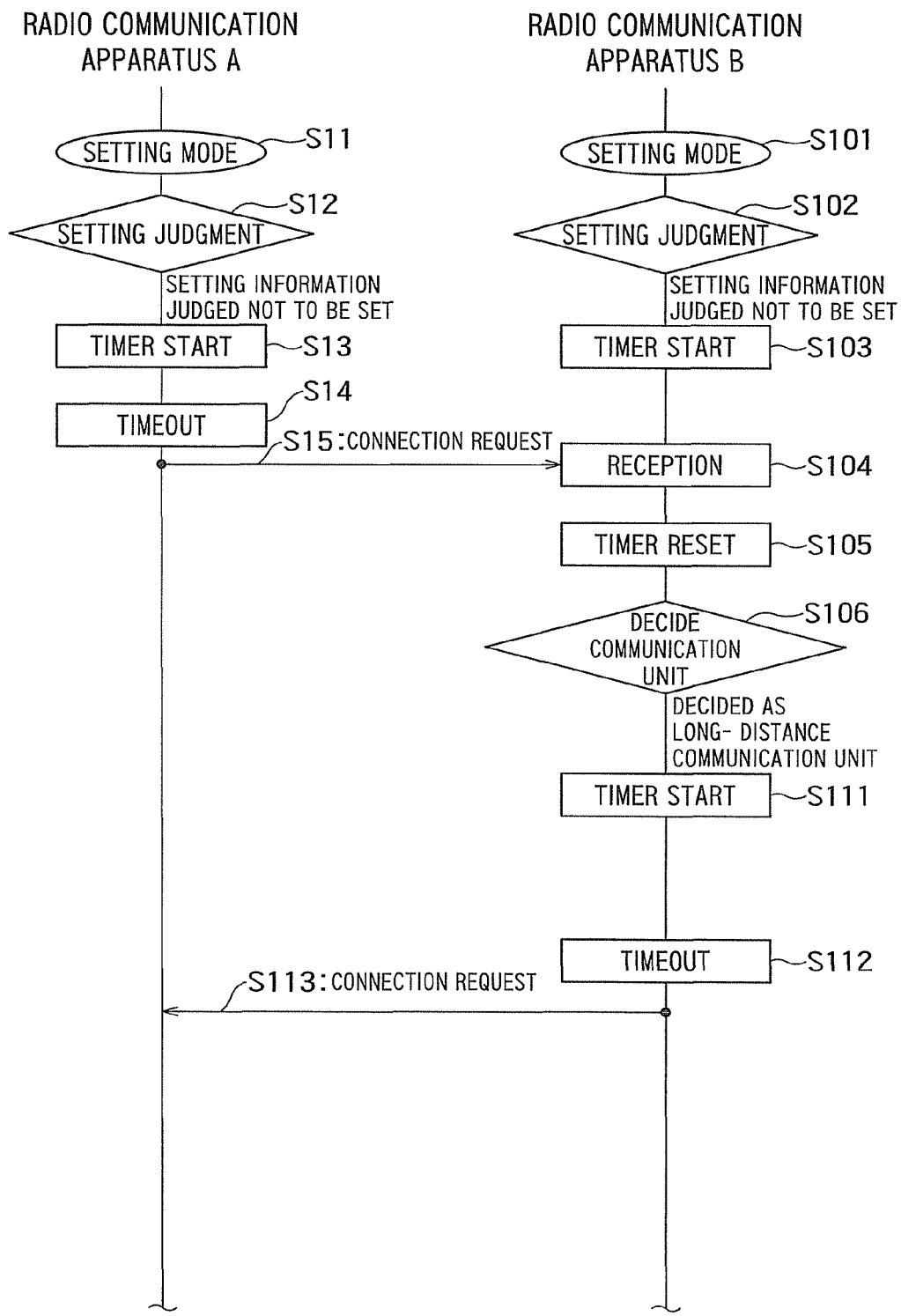
FIG. 7 shows a second example of initial setting sequence carried out between two radio communication apparatuses.

FIG. 7 shows a second example of the initial setting sequence executed between the radio communication apparatuses A and B.

Since steps S11 to S15 carried out at the radio communication apparatus A and steps S101 to S106 carried out at the radio communication apparatus B are the same as those in FIG. 6, overlapping explanations will be omitted except the expanded processing.

In step S106, suppose the reception deciding unit 22 of the radio communication apparatus B decides that a connection request frame has been received by the long-distance antenna 13 or both the short-distance and long-distance antennas 12 and 13. In this case, the setting judging unit 21 of the radio communication apparatus B determines to transmit the connection request frame, sets the timer to a random value and starts the timer (S111). This corresponds to the processing of the second starting unit of the present invention. When the timer times out (S112), the setting judging unit 21 transmits a connection request frame (second short-distance communication request) via the short-distance antenna 12 (S113). This corresponds to the processing of the request transmitting unit of the present invention. After this, the radio communication apparatus A side follows steps S16 to S19 shown in FIG. 6, while the radio communication apparatus B side follows steps S108 and S109 shown in FIG. 6.

Here, the expected value of the timer set in S111 (that is, expected value of the time interval until the connection request frame is transmitted) is preferably greater than the expected value of the value set in S103. This reason will be explained as follows.

That is, when it is decided in S106 that the frame has been received by at least the long-distance antenna 13, the radio communication apparatuses A and B have not approached each other yet, and therefore if the timer is set to a small value in step S111, a timeout results immediately and even if the connection request frame is transmitted to the radio communication apparatus A, the connection request frame is unlikely to be received by only the short-distance antenna 12. Therefore, by carrying out frame transmission after a lapse of a rather longer time to a certain extent from the decision in S106, it is preferable that only the short-distance antenna 12 on the radio communication apparatus A side reliably receive the connection request frame. Therefore, in step S111, suppose the expected value of the timer value is set to be greater than that in S103.

Alternatively, as another method of determining the timer value, instead of setting randomly, the timer value may be determined so as to be greater as the reception level of the short-distance antenna 12 of the connection request frame received in step S104 decreases. Alternatively, the timer value may be determined such that the expected value of the timer value set in S111 increases as the reception level of the short-distance antenna 12 of the connection request frame received in step S104 decreases. Effects similar to those described above can be obtained in this way, too.

Figure 8:
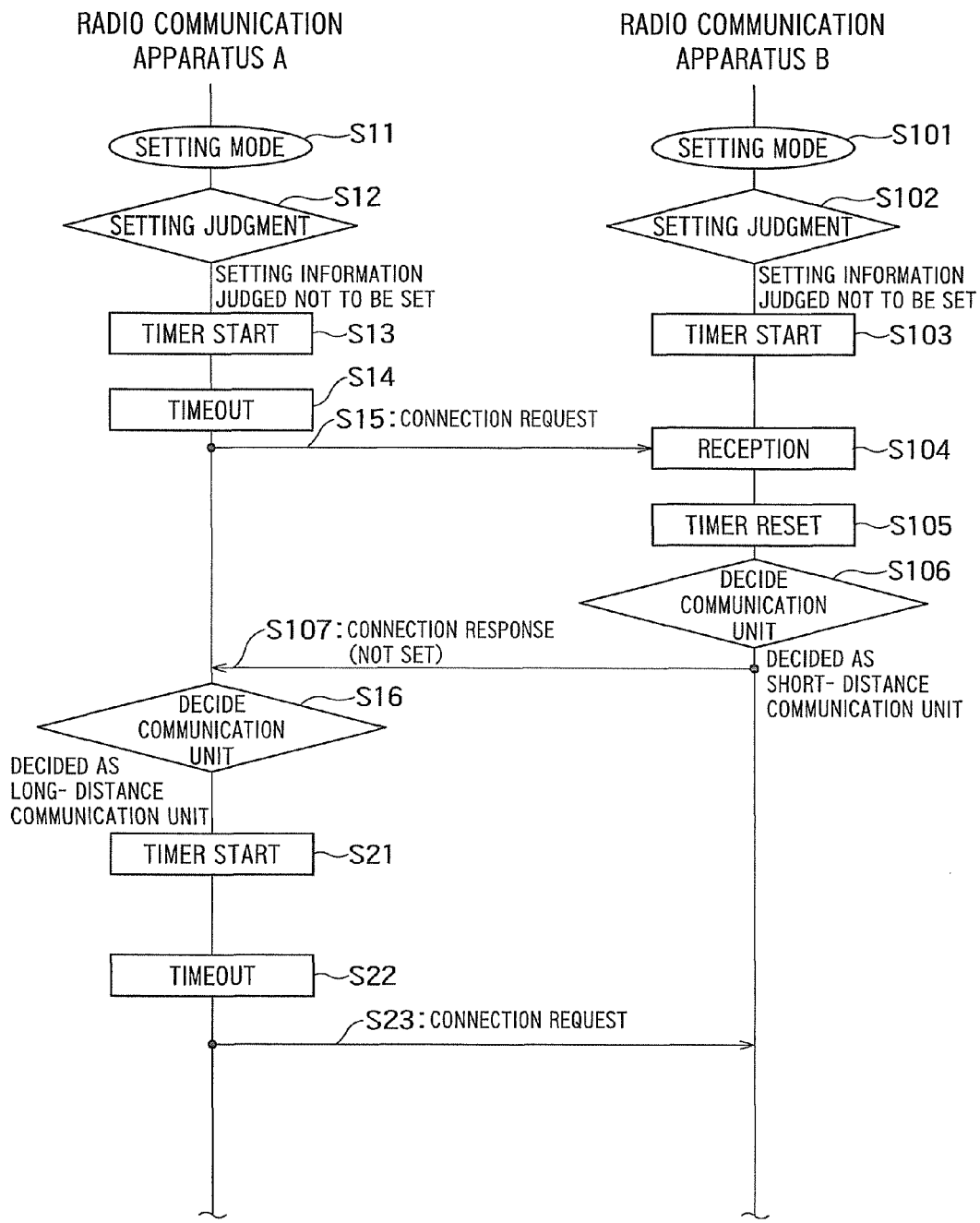
FIG. 8 shows a third example of initial setting sequence carried out between two radio communication apparatuses.

FIG. 8 shows a third example of the initial setting sequence executed between the radio communication apparatuses A and B.

Since steps S11 to S16 executed by the radio communication apparatus A and steps S101 to S107 executed by the radio communication apparatus B are basically the same as those in FIG. 6, overlapping explanations will be omitted except the expanded processing.

In step S16, suppose the reception deciding unit 22 of the radio communication apparatus A decides that a connection response frame (permission response) has been received by the long-distance antenna 13 or both the short-distance and long-distance antennas 12 and 13 (first or second state). In this case, the setting judging unit 21 of the radio communication apparatus A determines retransmission of the connection request frame, sets the timer to a random value and starts the timer (S21). This corresponds to, for example, the processing of the third starting unit of the present invention. When the timer times out (S22), the setting judging unit 21 transmits the connection request frame (third short-distance communication request) via the short-distance antenna 12 (S23). After this, when the reception deciding unit 22 of the radio communication apparatus A decides that the connection response frame has been received by only the short-distance antenna 12, the process follows a sequence similar to that in FIG. 6 (S17 to SI9).

Here, the expected value of the timer set in S21 is preferably greater than the expected value of the value set in S13 and the reason thereof is the same as that explained in FIG. 7. Alternatively, instead of randomly setting the timer value, the method of setting the timer value may be such that the timer value is determined so as to be increased as the reception level at the short-distance antenna 12 of the connection response frame transmitted from the radio communication apparatus B in S107 decreases. Alternatively, the method of setting the timer value may be such that the expected value of the timer value increases as the reception level at the short-distance antenna 12 of the connection response frame transmitted from the radio communication apparatus B in S107 decreases.

Figure 9:
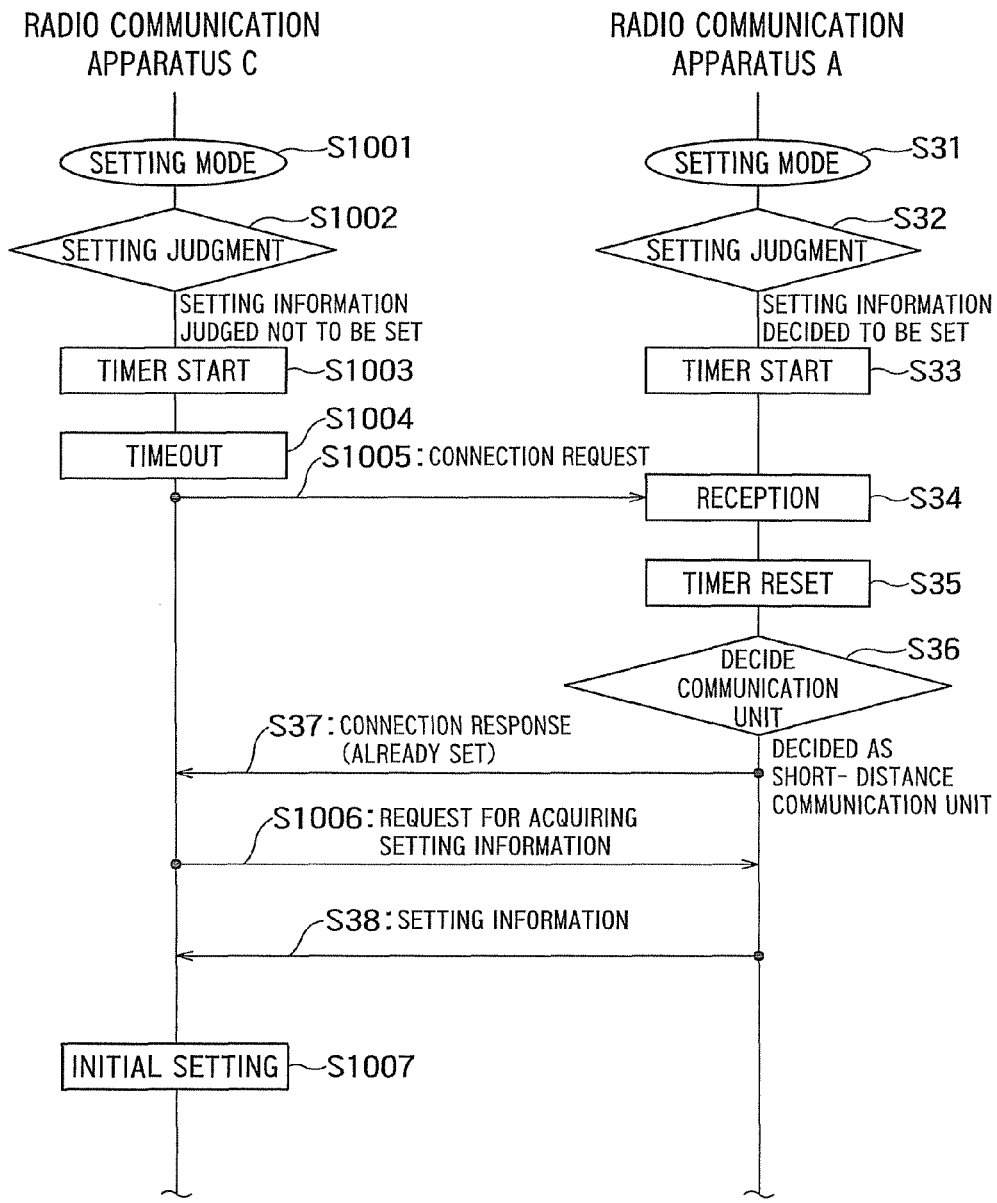
FIG. 9 shows a fourth example of initial setting sequence carried out between two radio communication apparatuses.

FIG. 9 shows a fourth example of the initial setting sequence executed between the radio communication apparatuses C and A. The initial setting has been completed between the radio communication apparatuses A and B according to any one of the sequences shown in FIG. 6 to FIG. 8 and an example will be explained where the initial setting sequence is further executed in this condition between the radio communication apparatuses C and A.

Each user of the radio communication apparatuses C and A depresses each setting button, each initial setting unit detects this and each radio communication apparatus enters the initial setting mode (S1001, S31). The transmission/reception unit 11 of the radio communication apparatuses A and C is connected to the short-distance antenna 12.

The setting judging unit 21 of the radio communication apparatuses C and A decides whether or not setting information is set in the setting information storage 24 (S1002, S32).

The setting judging unit 21 of the radio communication apparatus C decides that the setting information is not set, sets the timer to a random value and starts the timer (S1003). On the other hand, the setting judging unit 21 of the radio communication apparatus A decides that the setting information is stored, sets the timer to a random value and starts the timer (S13). That is, the timer is started irrespective of the presence/absence of storage of setting information.

The timer of the radio communication apparatus C times out (S1004) and the setting judging unit 21 transmits a connection request frame via the short-distance antenna 12 (S1005). The radio communication apparatus A decides that the connection request frame transmitted by the radio communication apparatus C has been received before the timer of the radio communication apparatus A times out (S34), and the setting judging unit 21 resets the timer (S35).

The reception deciding unit 22 of the radio communication apparatus A decides the antenna (communication unit) that has received the connection request frame (S36). That is, the reception deciding unit 22 decides whether the connection request frame has been received by only the short-distance antenna 12 (third state), only the long-distance antenna 13 (first state) or both the long-distance and short-distance antennas 12 and 13 (second state).

Here, the reception deciding unit 22 of the radio communication apparatus A decides that the connection request frame has been received by only the short-distance antenna 12 and transmits a response frame corresponding to the connection request frame including information reporting that the initial setting has already been performed (setting information has already been set) (S37).

The radio communication apparatus C decides that the connection request frame has been received by the radio communication apparatus A and decides the reception unit that has received the connection response frame (S1006). Upon deciding that the connection response frame has been received by only the short-distance antenna 12 (third state), the setting judging unit 21 of the radio communication apparatus C transmits an acquisition request frame of the setting information (acquisition request of the setting information) via the short-distance antenna 12 (S1006). This corresponds to an example of processing of the acquisition request transmitting unit of the present invention. When it is decided that the connection response frame has been received by the long-distance antenna 13 (first or second state), the timer is restarted in the same way as in steps S21 and S22 of FIG. 8 and when the timer times out, the acquisition request frame is retransmitted.

The radio communication apparatus A receives the acquisition request frame only via the short-distance antenna 12 and the setting judging unit 21 of the radio communication apparatus A reads the setting information set in the setting information storage 24 and transmits the setting information to the radio communication apparatus C via the short-distance antenna 12. When the acquisition request frame is received via at least the long-distance antenna 13, the transmission of the setting information may be suspended and the radio communication apparatus A may wait for retransmission of the acquisition request frame from the radio communication apparatus C.

The radio communication apparatus C acquires the setting information from the radio communication apparatus A via the short-distance antenna 12 and stores the acquired setting information in the setting information storage 24 (S1007). This corresponds to an example of the processing of the setting information acquiring unit of the present invention. This completes the initial setting of the radio communication apparatus C. This setting information is common among the radio communication apparatuses A, B and C and the radio communication apparatus C can thereby communicate data with not only the radio communication apparatus A but also the radio communication apparatus B via the long-distance antenna 13 based on this setting information.

Figure 10:
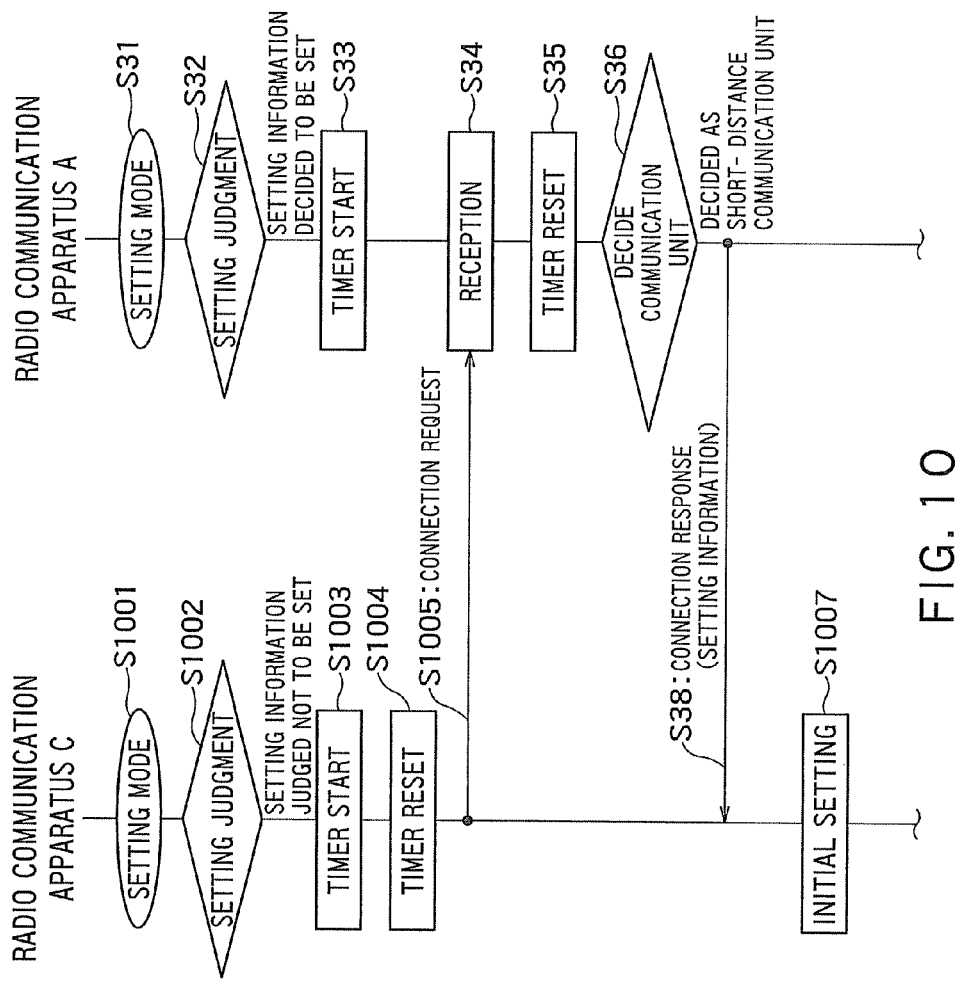
FIG. 10 shows a fifth example of initial setting sequence carried out between two radio communication apparatuses.

FIG. 10 shows a fifth example of the initial setting sequence resulting from partially changing the sequence of FIG. 9.

In the example of FIG. 9, the radio communication apparatus C has acquired the setting information by transmitting the acquisition request frame, but in the example of FIG. 10, when the radio communication apparatus A transmits a connection response frame, setting information is included in this connection response frame (S38). This allows the radio communication apparatus C to acquire the setting information without transmitting the acquisition request frame, and makes it possible to reduce the sequence until completion of the initial setting.

Figure 11:
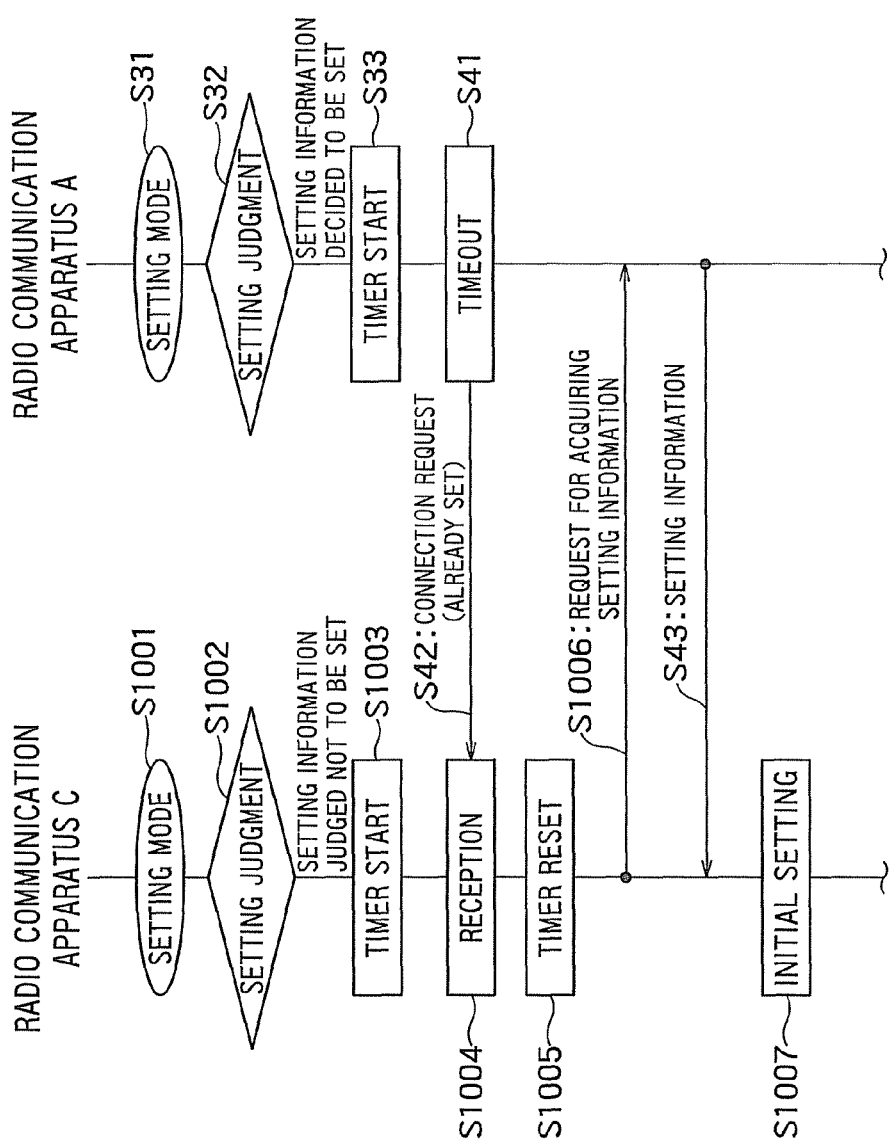
FIG. 11 shows a sixth example of initial setting sequence carried out between two radio communication apparatuses.

FIG. 11 shows a sixth example of the initial setting sequence resulting from partially changing the sequence of FIG. 9.

FIG. 9 has shown the example where the timer of the radio communication apparatus C times out first, but this example will show a case where the timer of the radio communication apparatus A times out first. Since S1001 to S1003, S32 and S33 are the same as those in FIG. 9, overlapping explanations will be omitted.

The timer of the radio communication apparatus A times out (S41) and the setting judging unit 21 of the radio communication apparatus A transmits a connection request frame including information reporting that the initial setting has already been performed (setting information has already been set) (S42).

When the reception deciding unit 22 of the radio communication apparatus C decides the reception of the connection request frame (S1004), the setting judging unit 21 of the radio communication apparatus C resets the timer (S1005). The reception deciding unit 22 then decides the antenna that has received the connection request frame and when the reception deciding unit 22 decides that the connection request frame has been received by only the short-distance antenna 12, the setting judging unit 21 transmits an acquisition request frame of the setting information via the short-distance antenna 12 (S1006). The radio communication apparatus C may also wait for retransmission from the radio communication apparatus A when the connection request frame has been received by at least the long-distance antenna 13.

The radio communication apparatus A receives the acquisition request frame only via the short-distance antenna 12 and the setting judging unit 21 of the radio communication apparatus A reads the setting information set in the setting information storage 24 and transmits the setting information to the radio communication apparatus C via the short-distance antenna 12 (S43). When the acquisition request frame has been received via at least the long-distance antenna 13, the transmission of the setting information may be suspended and the radio communication apparatus A may wait for retransmission of the acquisition request frame from the radio communication apparatus C.

Upon receiving the setting information from the radio communication apparatus A via the short-distance antenna 12, the radio communication apparatus C stores the received setting information in the setting information storage 24 (S1007).

The configuration example has been explained so far where the setting information is made up of an encryption key and a communication identifier, and another configuration example will be explained below.

FIG. 12(A) shows another configuration example of setting information.

This setting information is a set of encryption information and communication identifier (network identifier) associated with an application identifier. When the setting information in this configuration is used, in a decision on a shift to the initial setting mode (S12, S102, S1002, S32), the setting judging unit 21 specifies an application to which an instruction for a shift to the initial setting mode is inputted. The setting judging unit 21 then decides that the setting information has already been set when the identifier of the specified application is set in the setting information storage 24 or decides that the setting information has not been set yet when the identifier of the specified application is not set.

Furthermore, when generating setting information, the setting information generator 23 of the initial setting unit 14 generates encryption information and a communication identifier first, associates the information generated with the identifier of the application when an instruction for shift to the initial setting mode is inputted and stores the information in the setting information storage 24. It is thereby possible to manage the encryption information and communication identifier (network identifier) for each application.

FIG. 12(B) shows a further configuration example of the setting information.

This setting information corresponds to an application identifier associated with a set of network identifier, communication identifier (network identifier) and channel information. In a decision on a shift to the initial setting mode (S12, S102, S1002, S32), the setting judging unit 21 specifies an application to which an instruction for a shift to the initial setting mode is inputted. The setting judging unit 21 decides that the setting information has already been set when the identifier of the specified application is set in the setting information storage 24 or decides that the setting information has not been set yet when the identifier of the specified application is not set.

Furthermore, when generating setting information, the setting information generator 23 of the initial setting unit 14 determines a channel used by the application for long-distance communication when an instruction for a shift to the initial setting mode is inputted, associates the identifier of the specified application with encryption information, communication identifier and channel information and stores this in the setting information storage 24. During long-distance communication via the long-distance antenna 13, data communication is carried out using a channel indicated by the channel information included in the corresponding setting information. In this way, information of a channel used for each application may be included in the setting information.

The respective initial setting sequences in FIG. 6 to FIG. 11 have been explained so far based on the first configuration example of FIG. 1, but these sequences may also be executed by the other configuration examples (second configuration example to fifth configuration example) of the radio communication apparatus according to embodiments of the present invention. Hereinafter, the second to fifth configuration examples will be explained one by one.

Figure 2:
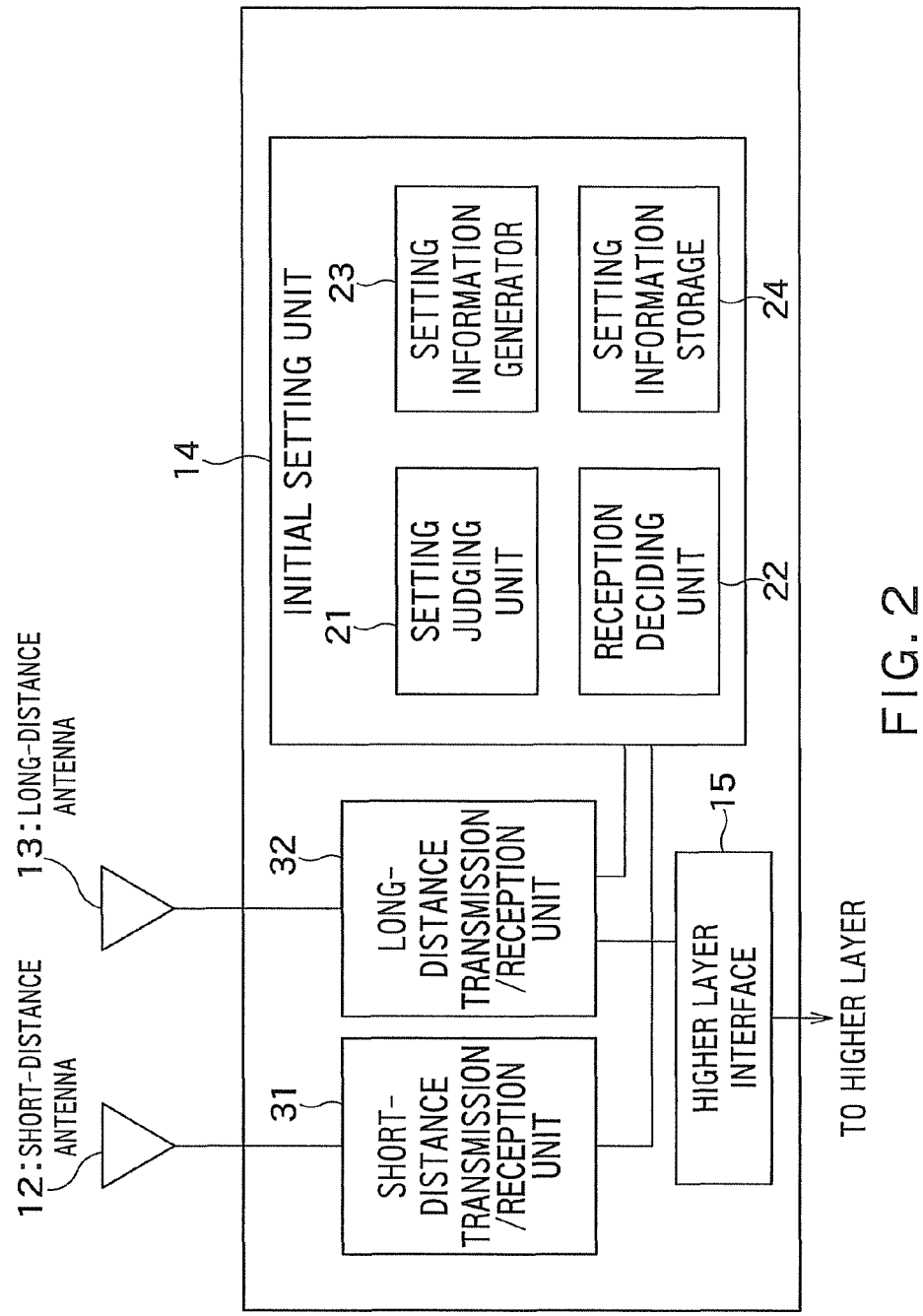
FIG. 2 is a block diagram showing a second configuration example of the radio communication apparatus according to an embodiment of the present invention.

FIG. 2 shows a second configuration example of the radio communication apparatus according to the embodiment of the present invention.

In the first configuration example of FIG. 1, the short-distance antenna 12 and long-distance antenna 13 share the transmission/reception unit 11 and the switching processing unit 16 switches the antenna connection, whereas in the second configuration example shown in FIG. 2, each antenna 12, 13 is provided with a short-distance transmission/reception unit 31 and a long-distance transmission/reception unit 32. This makes it possible to omit the switching processing unit (switch) 16, reduce loss at the switching processing unit 16 and thereby improve communication quality. Especially when a high frequency band such as a 60-GHz band is used, the size of the switching processing unit (switch) is large, and therefore the effect of eliminating the switching processing unit 16 is large. Furthermore, by providing dedicated transmission/reception units for the short-distance antenna and long-distance antenna respectively, it is possible to perform transmission/reception processing appropriate to their respective characteristics.

When this second configuration example is used, the reception deciding unit 22 can decide whether or not a frame (connection request frame, connection response frame or the like) has been received or whether the received frame has been received by the short-distance antenna or the long-distance antenna, by monitoring the short-distance transmission/reception unit 31 and long-distance transmission/reception unit 32. That is, the reception deciding unit 22 can decide that the frame has been received by only the short-distance antenna 12 when the frame is inputted only from the short-distance transmission/reception unit 31 or decide that the frame has been received by only the long-distance antenna 13 when the frame is inputted only from the long-distance transmission/reception unit 32 or decide that the frame has been received from both antennas 12 and 13 when the frame is inputted from both the transmission/reception units 31 and 32.

Figure 3:
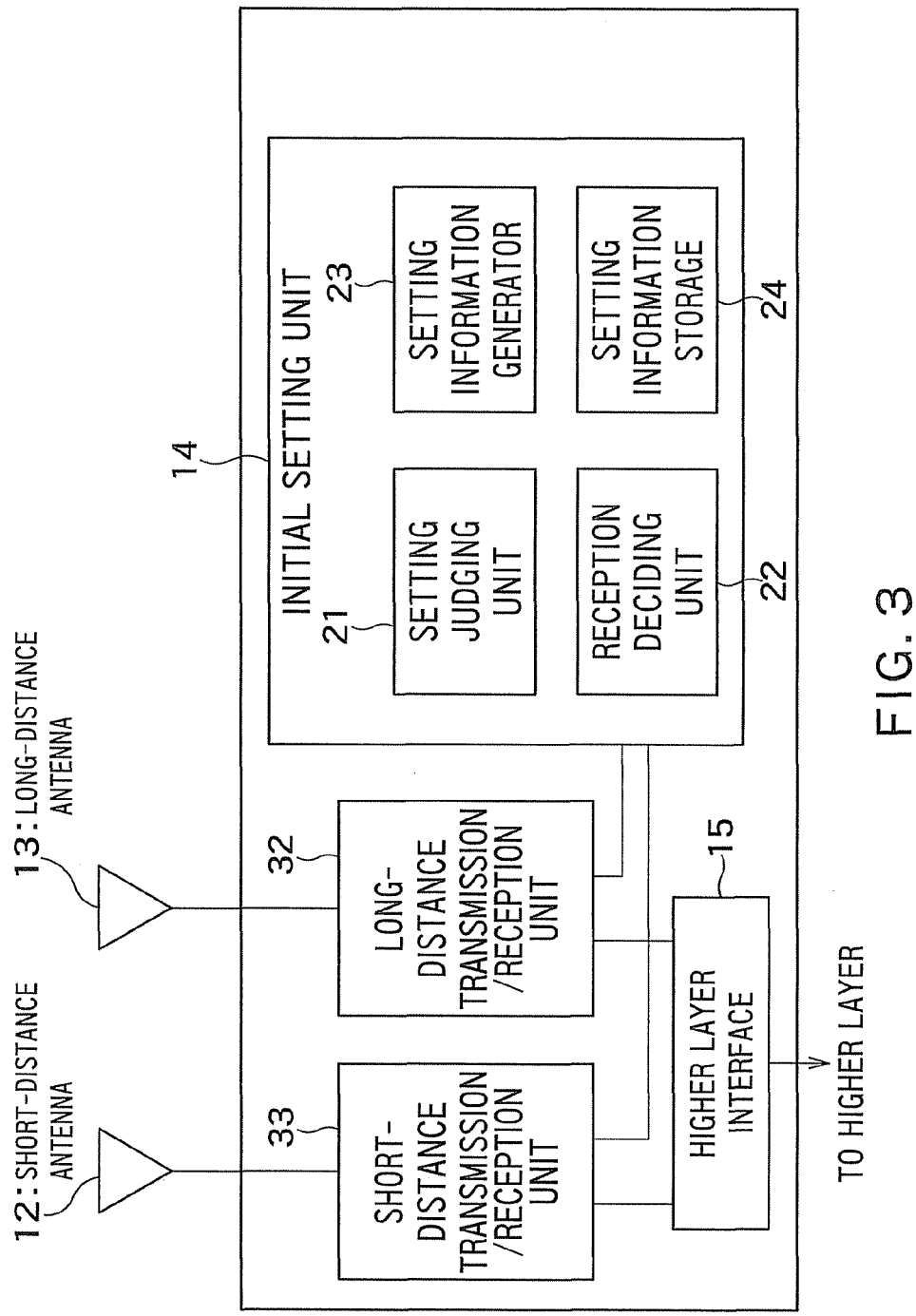
FIG. 3 is a block diagram showing a third configuration example of the radio communication apparatus according to an embodiment of the present invention.

FIG. 3 shows a third configuration example of the radio communication apparatus according to the embodiment of the present invention.

In the second configuration example of FIG. 2, the short-distance transmission/reception unit only handles data related to the initial setting, and is therefore not connected to the higher layer interface 15. On the contrary, in the third configuration example of FIG. 3, the short-distance transmission/reception unit as well as the long-distance transmission/reception unit 32 is connected to the higher layer interface 15. In this way, the short-distance transmission/reception unit 33 can transmit data from the higher layer via the short-distance antenna 12 and transfer data received from the short-distance antenna 12 to the higher layer. When such a configuration is adopted, if both radio communication apparatuses approach each other and the short-distance transmission/reception unit 33 is superior in energy-efficient transmission after the initial setting is completed, it is possible to realize energy saving by carrying out actual data communication via the short-distance transmission/reception unit 33.

Here, a decision as to whether to use the long-distance transmission/reception unit 32 or the short-distance transmission/reception unit 33 is made in actual data communication, for example, as follows. When an immediately preceding frame has been received by both the short-distance transmission/reception unit 32 and the long-distance transmission/reception unit 33, a decision is made to transmit the next frame using the short-distance transmission/reception unit 32 and when the immediately preceding frame has been received by the long-distance transmission/reception unit 33, a decision is made to transmit the data using the long-distance transmission/reception unit 33. The transmission/reception unit by which the immediately preceding frame has been received may be decided using the reception deciding unit 22 or a deciding unit for making such a decision may be added separately and the decision may be made using the deciding unit. When data is transmitted, the reception deciding unit 22 or the deciding unit may send a control signal specifying the transmission/reception unit to be used to the transmission/reception units 32 and 33 and the specified transmission/reception unit may transmit data. Therefore, the higher layer interface 15 makes a setting so as to transfer the same data to both the short-distance transmission/reception unit 32 and long-distance transmission/reception unit 33. Furthermore, as another method, the reception deciding unit 22 or the judging unit may report the decision result as to the transmission/reception unit by which the immediately preceding frame has been received to the higher layer interface 15 and the higher layer interface 15 may transfer data to be transmitted only to the reported transmission/reception unit.

Figure 4:
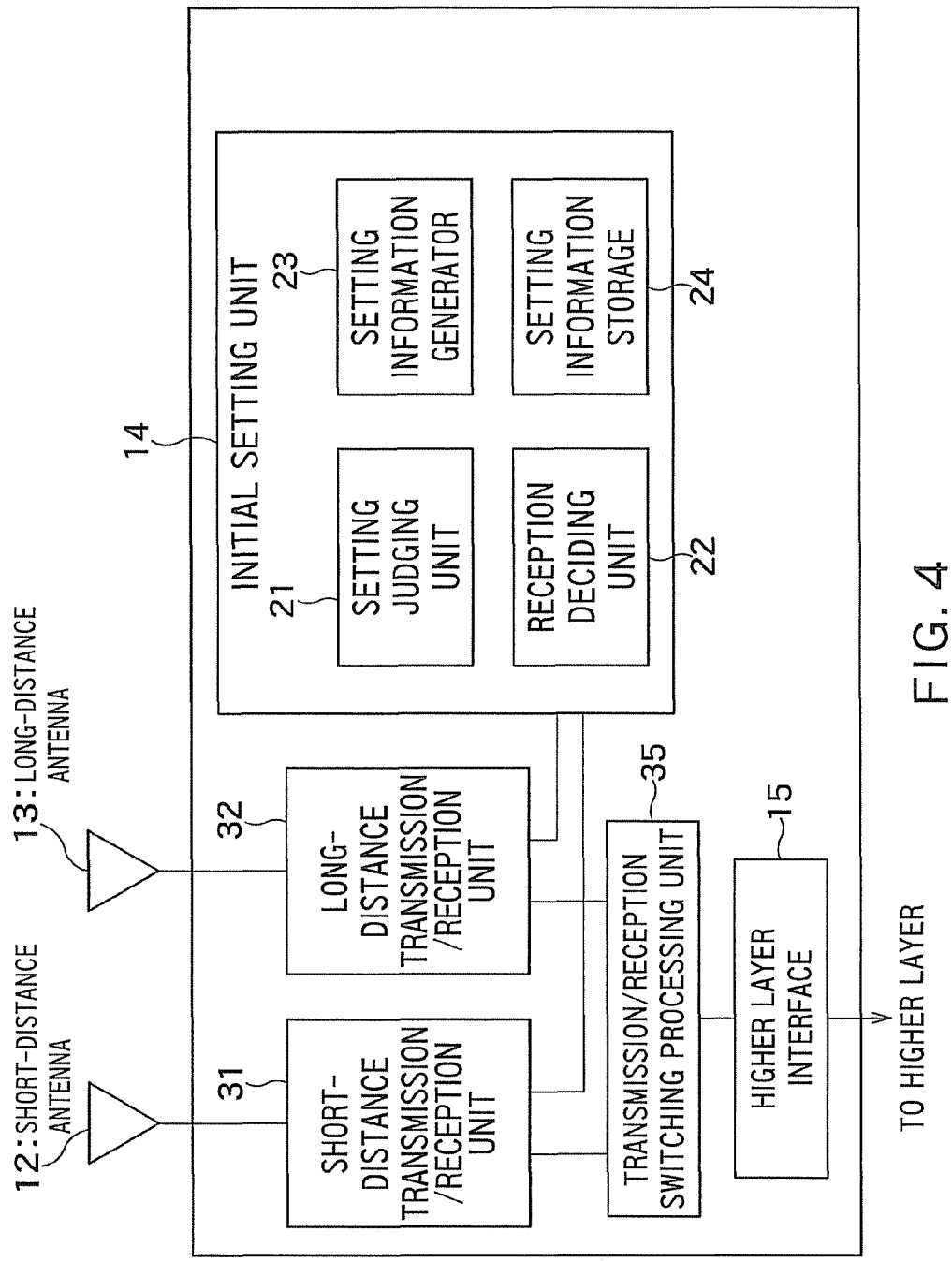
FIG. 4 is a block diagram showing a fourth configuration example of the radio communication apparatus according to an embodiment of the present invention.

FIG. 4 shows a fourth configuration example of the radio communication apparatus according to the embodiment of the present invention.

The difference from the third configuration example in FIG. 3 is that a transmission/reception switching processing unit 35 is added to the radio communication apparatus in FIG. 3. The transmission/reception switching processing unit 35 selectively switches any one of the short-distance transmission/reception unit 31 and the long-distance transmission/reception unit 32 according to the decision result of the reception deciding unit 22 or the above-described judging unit as to the transmission/reception unit by which the immediately preceding frame has been received. Alternatively, the transmission/reception switching processing unit 35 may determine which transmission/reception unit is used based on reception situations of the short-distance transmission/reception unit 31 and long-distance transmission/reception unit 32 and perform switching.

Figure 5:
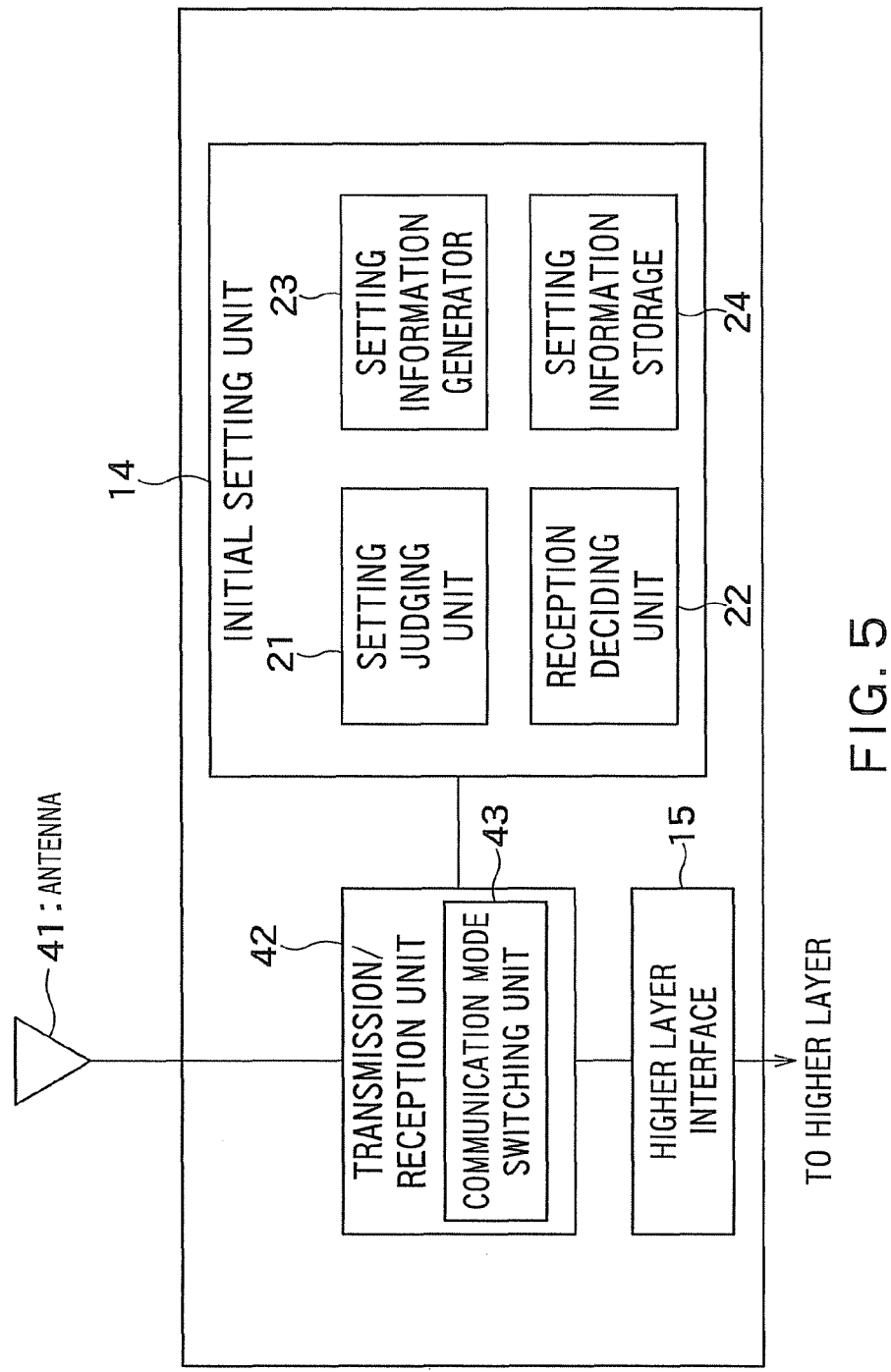
FIG. 5 is a block diagram showing a fifth configuration example of the radio communication apparatus according to an embodiment of the present invention.

FIG. 5 shows a fifth configuration example of the radio communication apparatus according to the embodiment of the present invention.

In the fifth configuration example in FIG. 5, one antenna 41 and one transmission/reception unit 42 are shared for long-distance and short-distance uses and a communication mode switching unit 43 switches the operation of the transmission/reception unit 42 between a long-distance mode and a short-distance mode.

The "short-distance mode" is a mode in which transmission is carried out, for example, with transmission power reduced (not amplified or the amplification factor is small) and reception is carried out with reception sensitivity reduced (e.g., not amplified by a low noise amplifier or the amplification factor is reduced). The bit width of a reception AD converter may be reduced on the ground that the variation of communication quality is small because of the short-distance.

Conversely, the "long-distance mode" is a mode in which transmission is carried out with increased transmission power and reception is carried out with increased reception sensitivity. Furthermore, the bit width of the reception AD converter may be increased on the groun that the variation of communication quality is large because of the long-distance.

When the fifth configuration example in FIG. 5 is used, the short-distance mode is set in the initial setting mode and the mode is changed to the long-distance mode when the initial setting is completed. In the initial setting mode, in the step of deciding the reception antenna (e.g., S16, 106), it may be decided that a frame has been received unconditionally by only the short-distance antenna 12. That is, when a frame is received in the short-distance mode, it may be decided that the frame has been received by only the short-distance antenna 12. In the present configuration example, the detection accuracy of proximity is reduced compared to the first to fourth configuration examples, but there is an advantage that the configuration is simple.

In the above-described embodiments, short-distance communication (e.g., transmission of setting information) is permitted only when a connection request (short-distance communication request) and connection response (permission response) are received by only the short-distance antenna, but short-distance communication may be permitted whenever a connection request or a connection response is received by the short-distance antenna regardless of the long-distance antenna.

As described above, according to the embodiments of the present invention, when a connection request frame is received by the short-distance antenna 12 and no connection request frame is received by the long-distance antenna 13, a connection request is permitted and an initial setting (short-distance communication) is performed via the short-distance antenna 12, whereas when the connection request frame is received by the long-distance antenna 13, the connection request is rejected so that the initial setting is not performed, and it is thereby possible to perform initial setting only when the radio communication apparatuses approach each other with certainty.

Furthermore, according to the embodiments of the present invention, when one or more radio communication terminals are subjected to additionally an initial setting in a situation in which the initial setting has already been completed between two radio communication apparatuses, the radio communication terminals to be added need only to perform an initial setting procedure with any one radio communication apparatus for which the initial setting has already been completed and need not perform the initial setting procedures with all radio communication apparatuses as in the case of the prior arts. For example, when there are five radio communication apparatuses, approach needs to be conventionally performed ten times as already described above, but the present embodiment requires approach only four times. That is, it is possible to share setting information for all radio communication apparatuses with only four times of approach. In this way, the present embodiments can simplify the initial setting procedure when there are three or more radio communication apparatuses.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A radio communication apparatus comprising:
a first communication unit configured to have a first communication coverage, the first communication unit including a first antenna and the first communication unit further configured to communicate with another communication apparatus in the first communication coverage when the other communication apparatus exists in the first communication coverage;
a second communication unit configured to have a second communication coverage wherein the second communication coverage includes, when the first communication coverage is divided into a short-distance portion near and a long-distance portion distant from the radio communication apparatus, at least the long-distance portion and does not include the short distance portion, the second communication unit including a second antenna different from the first antenna and the second communication unit further configured to communicate with the other communication apparatus in the long-distance portion of the first communication coverage when the other communication apparatus exists in the long-distance portion and incapable of communicating with the other communication apparatus in the short-distance portion of the first communication coverage when the other communication apparatus exists in the short-distance portion;
a reception detecting unit configured to detect that a short-distance communication request has been received by at least one of the first communication unit and the second communication unit;
a permission/rejection determining unit configured to permit the short-distance communication request when the short-distance communication request is received by the first communication unit and not received by the second communication unit, and reject the short-distance communication request when the short-distance communication request is received by the first communication unit and the second communication unit, respectively; and
a first communication processing unit configured to carry out short-distance communication with an other communication apparatus which has transmitted the short-distance communication request, via the first communication unit when the short-distance communication request is permitted.

2. The apparatus according to claim 1, further comprising:
an accepting unit configured to accept an instruction for executing short-distance communication from a user;
a first starting unit configured to set a timer to a random value and start the timer when the accepting unit accepts the instruction for executing the short-distance communication; and
a request transmitting unit configured to transmit the short-distance communication request to the other communication apparatus via the first communication unit when the timer times out without the reception of the short-distance communication request being detected.

3. The apparatus according to claim 2, further comprising a second starting unit configured to reset the timer to a random value and start the timer when the short-distance communication request is received by the second communication unit before the timer times out, wherein an expected value of the timer value set by the second starting unit is greater than an expected value of the timer value set by the first starting unit, and the request transmitting unit transmits a second short-distance communication request to the other communication apparatus when the timer started by the second starting unit times out.

4. The apparatus according to claim 1, further comprising:
a measuring unit configured to measure a level of a received signal by the second communication unit; and
a request transmitting unit configured to transmit a second short-distance communication request to the other communication apparatus via the first communication unit when the short-distance communication request is received by the second communication unit, wherein the request transmitting unit increases a time interval until the second short-distance communication request is transmitted after the short-distance communication request is received as the level of the received signal of the short-distance communication request decreases.

5. The apparatus according to claim 1, further comprising:
a storage configured to store setting information used in common with the other communication apparatus when carrying out long-distance communication via the second communication unit; and
a second communication processing unit configured to carry out the long-distance communication with the other communication apparatus via the second communication unit based on the setting information in the storage, wherein the first communication processing unit inspects whether or not the setting information is set in the storage when the short-distance communication request is permitted, and transmits an acquisition request of the setting information to the other communication apparatus when the setting information is not set, acquires setting information returned from the other communication apparatus in response to the acquisition request and sets the acquired setting information in the storage.

6. The apparatus according to claim 5, wherein the first communication processing unit transmits a response indicating that the setting information has already been set to the other communication apparatus when the setting information is set in the storage.

7. The apparatus according to claim 6, wherein the first communication processing unit transmits the response together with the setting information set in the storage.

8. The apparatus according to claim 1, further comprising a request transmitting unit configured to transmit the short-distance communication request to the other communication apparatus via the first communication unit, wherein the reception detecting unit detects that a permission response to the transmitted short-distance communication request has been received by at least one of the first communication unit and the second communication unit, the first communication processing unit carries out the short-distance communication with the other communication apparatus via the first communication unit when the permission response is received by the first communication unit and not received by the second communication unit, and the request transmitting unit transmits a third short-distance communication request to the other communication apparatus via the first communication unit when the permission response is received by the second communication unit.

9. The apparatus according to claim 8, further comprising:
an accepting unit configured to accept an instruction for executing short-distance communication from the user; and
a first starting unit configured to set a timer to a random value and start the timer when the accepting unit accepts the instruction for executing the short-distance communication, wherein the request transmitting unit transmits the short-distance communication request to the other communication apparatus when the timer times out without reception of the short-distance communication request from the other communication apparatus.

10. The apparatus according to claim 9, further comprising a third starting unit configured to set the timer to a random value and start the timer when the permission response is received by the second communication unit, wherein an expected value of the timer value set by the third starting unit is greater than an expected value of the timer value set by the first starting unit, and the request transmitting unit transmits the third short-distance communication request when the timer times out.

11. The apparatus according to claim 8, further comprising a measuring unit configured to measure a level of a received signal by the second communication unit, wherein the request transmitting unit increases a time interval until the third short-distance communication request is transmitted as the level of the received signal of the permission response decreases.

12. The apparatus according to claim 8, further comprising:
a storage configured to store setting information used in common with the other communication apparatus when carrying out long-distance communication via the second communication unit; and
a second communication processing unit configured to carry out the long-distance communication with the other communication apparatus based on the setting information in the storage via the second communication unit, wherein the first communication processing unit inspects whether or not the setting information has already been set in the other communication apparatus when the setting information is not stored in the storage, transmits an acquisition request of the setting information to the other communication apparatus when the setting information has already been set in the other communication apparatus, acquires the setting information returned from the other communication apparatus and stores the acquired setting information in the storage, and generates setting information when the setting information has not been set yet in the other communication apparatus, stores the generated setting information in the storage and transmits the setting information to the other communication apparatus.

13. The apparatus according to claim 12, wherein when the setting information has already been set in the storage and has not set the setting information yet in the other communication apparatus, the first communication processing unit reads the setting information in the storage and transmits the setting information to the other communication apparatus.

14. The apparatus according to claim 12, wherein the permission response includes information indicating whether or not the setting information has already been set in the other communication apparatus, and the first communication processing unit determines whether or not the setting information has already been set in the other communication apparatus based on the information included in the permission response.

15. The apparatus according to claim 5, wherein the setting information includes a communication identifier and an encryption key, and the second communication processing unit uses the communication identifier as a destination address of data to be transmitted to the other communication apparatus.

16. The apparatus according to claim 5, wherein the setting information includes a communication identifier and an encryption key, and the second communication processing unit uses a broadcast address as a destination address of data to be transmitted to the other communication apparatus and includes the communication identifier in the data to be transmitted to the other communication apparatus.

17. The apparatus according to claim 15, wherein the setting information further comprises identification information of a channel to be used by the second communication unit.

18. The apparatus according to claim 15, wherein the setting information is stored in the storage in association with application identifiers, the short-distance communication request includes one application identifier, and when the application identifier included in the short-distance communication request matches with one of the application identifiers in the storage, the first communication processing unit determines that the setting information has already been set in the storage.

19. The apparatus according to claim 1, wherein
the first antenna is an induction field antenna and the second antenna is a radiation field antenna.

20. A radio communication method performed in a radio communication apparatus which includes a first communication unit having a first communication coverage and a long-distance portion and a second communication unit having a second communication coverage wherein the second communication coverage includes, when the first communication coverage is divided into a short-distance portion near and a long-distance portion distant from the radio communication apparatus, at least the long-distance portion and does not include the short distance portion, the first communication unit includes a first antenna and the second communication unit includes a second antenna different from the first antenna, the first communication unit is configured to communicate with another communication apparatus in the first communication coverage when the other communication apparatus exists in the first communication coverage and the second communication unit is configured to communicate with the other communication apparatus in the long-distance portion of the first communication coverage when the other communication apparatus exists in the long-distance portion and incapable of communicating with the other communication apparatus in the short-distance portion of the first communication coverage when the other communication apparatus exists in the short-distance portion, the method comprising:

detecting that a short-distance communication request has been received by at least one of the first communication unit and the second communication unit;

permitting the short-distance communication request when the short-distance communication request is received by the first communication unit and not received by the second communication unit, and rejecting the short-distance communication request when the short-distance communication request is received by the first communication unit and the second communication unit, respectively; and carrying out short-distance communication with an other communication apparatus which has transmitted the short-distance communication request, via the first communication unit when the short-distance communication request is permitted.

\* \* \* \* \*